US 6,627,252 B1

(12) United States Patent
Nanjundiah et al.

(10) Patent No.: US 6,627,252 B1
(45) Date of Patent: Sep. 30, 2003

(54) ELECTROCHEMICAL DOUBLE LAYER CAPACITOR HAVING CARBON POWDER ELECTRODES (75) Inventors: Chenniah Nanjundiah, San Diego, CA (US); Richard P. Braun, San Diego, CA (US); Raymond T. E. Christie, Escondido, CA (US); C. Joseph Farahmandi, San Diego, CA (US)

(73) Assignee: Maxwell Electronic Components, Inc., San Diego, CA (US)

( * ) Notice: Subject to any disclaimer, the term of this patent is extended or adjusted under 35 U.S.C. 154(b) by 0 days.

(21) Appl. No.: 09/569,679

(22) Filed: May 12, 2000

(51) Int. Cl.⁷ .................................................. B05D 5/12

(52) U.S. Cl. ........................ 427/79; 427/80; 427/122; 29/25.03

(58) Field of Search ............................. 423/445 R, 448; 427/79, 80, 122, 180, 196, 199, FOR 100; 29/25.03

(56) References Cited

U.S. PATENT DOCUMENTS

| 2,234,608 A | 3/1941 | Robinson et al. |
| 3,288,641 A | 11/1966 | Rightmire |
| 3,536,963 A | 10/1970 | Boos ............ 317/230 |
| 3,617,387 A | 11/1971 | Grulke et al. |
| 3,648,337 A | 3/1972 | Greskamp et al. |
| 3,838,092 A | 9/1974 | Vogt et al. |
| 3,864,124 A | 2/1975 | Breton et al. |
| 3,935,029 A | 1/1976 | Baker et al. |
| 3,977,901 A | 8/1976 | Buzzelli |
| 4,096,277 A | 6/1978 | Gore |
| 4,153,661 A | 5/1979 | Ree et al. |
| 4,161,063 A | 7/1979 | Goebel et al. |
| 4,163,811 A | 8/1979 | Kohlmayr et al. |
| 4,187,390 A | 2/1980 | Gore |
| 4,278,525 A | 7/1981 | Gestaut |
| 4,317,789 A | 3/1982 | Groult et al. |
| 4,320,184 A | 3/1982 | Bernstein et al. |
| 4,320,185 A | 3/1982 | Bernstein et al. |
| 4,327,400 A | 4/1982 | Muranaka et al. |
| 4,337,140 A | 6/1982 | Solomon |
| 4,341,847 A | 7/1982 | Sammells |
| 4,354,958 A | 10/1982 | Solomon |
| 4,379,772 A | 4/1983 | Solomon et al. |
| 4,396,693 A | 8/1983 | Bernstein et al. |
| 4,440,835 A | 4/1984 | Vignaud |
| 4,457,953 A | 7/1984 | McIntyre et al. |
| 4,500,647 A | 2/1985 | Solomon |
| 4,556,618 A | 12/1985 | Shia |
| 4,576,861 A | 3/1986 | Kato |
| 4,594,758 A | 6/1986 | Watanabe et al. .......... 29/25.42 |
| 4,664,683 A | 5/1987 | Degen et al. |

(List continued on next page.)

FOREIGN PATENT DOCUMENTS

| CA | 849697 | 8/1970 | .................... 334/8 |
| EP | 0443825 | 8/1991 | ............ H01G/9/00 |
| EP | 0622815 | 11/1994 | ............ H01G/9/04 |

(List continued on next page.)

Primary Examiner—Brian K. Talbot
(74) Attorney, Agent, or Firm—Fitch, Even, Tabin & Flannery (57) ABSTRACT A double layer capacitor includes first and second electrode structures separated by a porous separator. The first and second electrode structures each include a current collector foil, a primary coating formed on the current collector foil, and a secondary coating formed on the primary coating. The primary coatings include conducting carbon powder, and the secondary coatings include activated carbon powder. A method of making the electrode structures includes the steps of: preparing a first slurry that includes conducting carbon powder and a binder; applying the first slurry to a current collector plate; drying the applied first slurry to form a primary coating; preparing a second slurry that includes activated carbon powder, a solvent and a binder; and applying the second slurry to the primary coating.

11 Claims, 7 Drawing Sheets

U.S. PATENT DOCUMENTS

| | | | |
|---|---|---|---|
| 4,700,450 A | 10/1987 | Michel | |
| 4,730,239 A | 3/1988 | Currie et al. | 361/433 |
| 4,737,889 A | 4/1988 | Nishino et al. | |
| 4,760,494 A | 7/1988 | Crum | |
| 4,804,592 A | 2/1989 | Vanderborgh et al. | |
| 4,853,305 A | 8/1989 | Anderman et al. | |
| 4,862,328 A | 8/1989 | Morimoto et al. | |
| 4,866,117 A | 9/1989 | Egashira et al. | |
| 4,908,281 A | 3/1990 | O'Callaghan | |
| 4,985,296 A | 1/1991 | Mortimer, Jr. | |
| 5,012,385 A | 4/1991 | Kurabayashi et al. | 361/328 |
| 5,019,311 A | 5/1991 | Koslow | |
| 5,065,286 A | 11/1991 | Kurabayashi et al. | 361/502 |
| 5,071,610 A | 12/1991 | Hagen et al. | |
| 5,103,379 A | 4/1992 | Kurabayashi et al. | 361/502 |
| 5,121,301 A | 6/1992 | Kurabayashi et al. | 361/502 |
| 5,142,451 A | 8/1992 | Kurabayashi et al. | 361/502 |
| 5,145,752 A | 9/1992 | Goldstein et al. | |
| 5,147,539 A | 9/1992 | Hagen et al. | |
| 5,147,722 A | 9/1992 | Koslow | |
| 5,150,283 A | 9/1992 | Yoshida et al. | |
| 5,158,722 A | 10/1992 | Ilic et al. | |
| 5,172,307 A | 12/1992 | Tabuchi et al. | |
| 5,190,833 A | 3/1993 | Goldstein et al. | |
| 5,253,148 A | 10/1993 | Katsu | 361/539 |
| 5,277,729 A | 1/1994 | Endo et al. | |
| 5,318,862 A | 6/1994 | Liu et al. | |
| 5,350,643 A | 9/1994 | Imahashi et al. | |
| 5,351,164 A | 9/1994 | Grigortchak et al. | 361/502 |
| 5,381,301 A | 1/1995 | Hudis | |
| 5,381,303 A * | 1/1995 | Yoshida et al. | 361/502 |
| 5,398,155 A | 3/1995 | Sato et al. | 361/502 |
| 5,442,197 A | 8/1995 | Andrieu et al. | 257/40 |
| 5,453,909 A | 9/1995 | Kobayashi | 361/502 |
| 5,468,574 A | 11/1995 | Ehrenberg et al. | |
| 5,471,365 A | 11/1995 | Nakamura et al. | 361/523 |
| 5,478,363 A | 12/1995 | Klein | |
| 5,550,706 A | 8/1996 | Kurzweil et al. | 361/502 |
| 5,581,438 A | 12/1996 | Halliop | 361/502 |
| 5,585,999 A | 12/1996 | De Long et al. | 361/505 |
| 5,593,462 A | 1/1997 | Gueguen et al. | |
| 5,620,597 A | 4/1997 | Andelman | |
| 5,620,807 A | 4/1997 | Mussell et al. | |
| 5,621,608 A | 4/1997 | Arai et al. | 361/525 |
| 5,659,457 A | 8/1997 | Lian et al. | 361/502 |
| 5,665,212 A | 9/1997 | Zhong et al. | |
| 5,682,288 A | 10/1997 | Wani | 361/502 |
| 5,697,390 A | 12/1997 | Garrison et al. | |
| 5,706,165 A | 1/1998 | Saito et al. | |
| 5,742,474 A | 4/1998 | Shimizu et al. | 361/502 |
| 5,748,438 A | 5/1998 | Davis et al. | 361/504 |
| 5,748,439 A | 5/1998 | MacFarlane et al. | 361/525 |
| 5,751,541 A * | 5/1998 | Li et al. | 361/525 |
| 5,786,981 A | 7/1998 | Aoki et al. | 361/502 |
| 5,793,603 A | 8/1998 | Lyman | 361/503 |
| 5,796,574 A | 8/1998 | Saito et al. | 361/502 |
| 5,812,367 A | 9/1998 | Kudoh et al. | 361/523 |
| 5,837,630 A | 11/1998 | Owens et al. | 501/80 |
| 5,847,919 A | 12/1998 | Shimizu et al. | |
| 5,847,920 A | 12/1998 | Li et al. | 361/525 |
| 5,850,331 A | 12/1998 | Matsumoto et al. | 361/502 |
| 5,875,092 A | 2/1999 | Jow et al. | 361/502 |
| 5,877,935 A | 3/1999 | Sato et al. | |
| 5,909,356 A | 6/1999 | Hirabayashi et al. | 361/523 |
| 5,914,852 A | 6/1999 | Hatanaka et al. | 361/523 |
| 5,916,485 A | 6/1999 | Besenhard et al. | |
| 5,917,693 A | 6/1999 | Kono et al. | 361/523 |
| 5,920,455 A | 7/1999 | Shah et al. | 361/502 |
| 5,923,525 A | 7/1999 | Belyakov et al. | 361/502 |
| 5,926,361 A | 7/1999 | Alford | 361/502 |
| 5,930,108 A | 7/1999 | Kurzweil et al. | 361/502 |
| 5,949,638 A | 9/1999 | Greenwood et al. | 361/508 |
| 5,955,215 A | 9/1999 | Kurzweil et al. | 429/41 |
| 5,956,225 A | 9/1999 | Okuyama et al. | |
| 5,959,832 A | 9/1999 | Kobayashi et al. | 361/525 |
| 6,031,712 A * | 2/2000 | Kurihara et al. | 361/502 |
| 6,127,060 A | 10/2000 | Read | |
| 6,127,474 A | 10/2000 | Andelman | |
| 6,195,251 B1 | 2/2001 | Suhara et al. | |
| 6,270,707 B1 | 7/2001 | Hori et al. | |
| 6,310,756 B1 | 10/2001 | Miura et al. | |
| 6,335,857 B1 | 1/2002 | Takimoto et al. | |
| 6,359,769 B1 | 3/2002 | Mushiake et al. | |
| 6,368,365 B1 | 4/2002 | Chi et al. | |
| 6,383,427 B2 | 5/2002 | Ishikawa et al. | |
| 6,402,792 B1 | 6/2002 | Hiratsuka et al. | |
| 6,424,517 B1 | 7/2002 | Ikeda et al. | |
| 6,456,484 B1 | 9/2002 | Matsuoka et al. | |
| 6,493,210 B2 | 12/2002 | Nonaka et al. | |

FOREIGN PATENT DOCUMENTS

| | | | | |
|---|---|---|---|---|
| JP | 63268221 | 4/1988 | | H01G/9/00 |
| JP | 1246812 | 2/1989 | | H01G/9/00 |
| JP | 6446913 | 2/1989 | | H01G/9/00 |
| JP | 1222425 | 5/1989 | | H01G/9/00 |
| JP | 1304719 | 8/1989 | | H01G/9/00 |
| JP | 256913 | 2/1990 | | H01G/9/00 |
| JP | 265114 | 3/1990 | | H01G/9/00 |
| JP | 278213 | 3/1990 | | H01G/9/00 |
| JP | 21104 | 5/1990 | | H01G/9/00 |
| JP | 34510 | 1/1991 | | H01G/9/00 |
| JP | 3132009 | 6/1991 | | H01G/9/00 |
| JP | 3201516 | 6/1991 | | H01G/9/00 |
| JP | 474405 | 3/1992 | | H01G/9/00 |
| JP | 488619 | 3/1992 | | H01G/9/00 |
| JP | 499305 | 3/1992 | | H01G/9/00 |
| JP | 4336409 | 11/1992 | | H01G/9/00 |
| JP | 513284 | 1/1993 | | H01G/9/05 |
| JP | 555085 | 3/1993 | | H01G/9/00 |
| JP | 5217803 | 8/1993 | | H01G/9/00 |
| JP | 5258996 | 10/1993 | | H01G/9/00 |
| WO | 9309552 | 5/1993 | | H01G/9/00 |

* cited by examiner

ELECTROCHEMICAL DOUBLE LAYER CAPACITOR HAVING CARBON POWDER ELECTRODES

BACKGROUND OF THE INVENTION

The present invention relates generally to electric double layer capacitors, and more particularly to a high performance double layer capacitor made with low-resistance carbon powder electrodes.

Double layer capacitors, also referred to as electrochemical double layer capacitors (EDLC), are energy storage devices that are able to store more energy per unit weight and unit volume than traditional capacitors. In addition, they can typically deliver the stored energy at a higher power rating than rechargeable batteries.

Double layer capacitors consist of two porous electrodes that are isolated from electrical contact by a porous separator. Both the separator and the electrodes are impregnated with an electrolytic solution. This allows ionic current to flow between the electrodes through the separator at the same time that the separator prevents an electrical or electronic (as opposed to an ionic) current from shorting the cell. Coupled to the back of each of the active electrodes is a current collecting plate. One purpose of the current collecting plate is to reduce ohmic losses in the double layer capacitor. If these current collecting plates are non-porous, they can also be used as part of the capacitor seal.

Double layer capacitors store electrostatic energy in a polarized liquid layer which forms when a potential exists between two electrodes immersed in an electrolyte. When the potential is applied across the electrodes, a double layer of positive and negative charges is formed at the electrode-electrolyte interface (hence, the name "double layer" capacitor) by the polarization of the electrolyte ions due to charge separation under the applied electric field, and also due to the dipole orientation and alignment of electrolyte molecules over the entire surface of the electrodes.

The use of carbon electrodes in electrochemical capacitors with high power and energy density represents a significant advantage in this technology because carbon has a low density and carbon electrodes can be fabricated with very high surface areas. Fabrication of double layer capacitors with carbon electrodes has been known in the art for quite some time, as evidenced by U.S. Pat. No. 2,800,616 (Becker), and U.S. Pat. No. 3,648,126 (Boos et al.).

A major problem in many carbon electrode capacitors, including double layer capacitors, is that the performance of the capacitor is often limited because of the high internal resistance of the carbon electrodes. This high internal resistance may be due to several factors, including the high contact resistance of the internal carbon-carbon contacts, and the contact resistance of the electrodes with a current collector. This high resistance translates to large ohmic losses in the capacitor during the charging and discharge phases, which losses further adversely affect the characteristic RC (resistance times capacitance) time constant of the capacitor and interfere with its ability to be efficiently charged and/or discharged in a short period of time. There is thus a need in the art for lowering the internal resistance, and hence the time constant, of double layer capacitors.

U.S. Pat. No. 5,907,472 to Farahmandi et al., the complete disclosure of which is incorporated herein by reference, discloses a multi-electrode double layer capacitor having a single electrolyte seal and aluminum-impregnated carbon cloth electrodes. The use of the aluminum-impregnated carbon cloth electrodes described therein results in a double layer capacitor having a very low internal resistance. The carbon cloth used in such electrodes, however, tends to be somewhat costly. Thus, it would be advantageous to have a method and/or apparatus for lowering the internal resistance of double layer capacitors that does not rely on carbon cloth.

It is thus apparent that there is a continuing need for improved double layer capacitors. Such improved double layer capacitors need to deliver large amounts of useful energy at a very high power output and energy density ratings within a relatively short period of time. Such improved double layer capacitors should also have a relatively low internal resistance and yet be capable of yielding a relatively high operating voltage.

Furthermore, it is also apparent that improvements are needed in the techniques and methods of fabricating double layer capacitor electrodes so as to lower the internal resistance of the double layer capacitor and maximize the operating voltage. For example, the method used to connect the current collector plate to the electrode is important because the interface between the electrode and the current collector plate is a source of internal resistance of the double layer capacitor. Since capacitor energy density increases with the square of the operating voltage, higher operating voltages thus translate directly into significantly higher energy densities and, as a result, higher power output ratings. It is thus readily apparent that improved techniques and methods are needed to lower the internal resistance of the electrodes used within a double layer capacitor and increase the operating voltage.

SUMMARY OF THE INVENTION

The present invention advantageously addresses the needs above as well as other needs by providing a method of making an electrode structure for use in a double layer capacitor. The method includes the steps of: preparing a first slurry that includes conducting carbon powder and a binder; applying the first slurry to a current collector plate; drying the applied first slurry to form a primary coating; preparing a second slurry that includes activated carbon powder, a solvent and a binder; and applying the second slurry to the primary coating.

The present invention also provides a double layer capacitor that includes first and second electrode structures, a porous separator, and a saturation means. The first electrode structure includes a first current collector foil, a first primary coating formed on the first current collector foil, and a first secondary coating formed on the first primary coating. The second electrode structure includes a second current collector foil, a second primary coating formed on the second current collector foil, and a second secondary coating formed on the second primary coating. The first and second primary coatings include conducting carbon powder, and the first and second secondary coatings include activated carbon powder. The porous separator is positioned between the first and second electrodes structures. The saturation means saturates the porous separator and the first and second electrodes structures in a prescribed electrolytic solution.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof presented in conjunction with the following drawings herein.

Corresponding reference characters indicate corresponding components throughout several views of the drawing.

DETAILED DESCRIPTION OF THE INVENTION

The following description of the presently contemplated best mode of practicing the invention is not to be taken in a limiting sense, but is made merely for the purpose of describing the general principle of the invention. The scope of the invention should be determined with reference to the claims.

Activated carbon powders can be used to provide high capacitance in electrochemical double-layer capacitors (EDLC). A high capacitance is possible due to the large surface area of activated carbon, which is on the order of 1000 to 2500 m$^2$/g.

One possible method of making carbon powder electrodes is to apply the activated carbon powders onto current collectors in the form of a slurry. Such a slurry of activated carbon powder may be made in a solution containing a polymer binder. The resultant electrodes, however, tend to be resistive. To partially alleviate this problem, a small percentage (e.g., 1–2%) of a carbon, which is more conducting than the activated carbon, may be added to the slurry. Thus, the electrodes are made by applying a single coat of activated carbon, conducting carbon, and a polymer binder onto current collectors. Unfortunately, the time constants of EDLC capacitors having these types of electrodes typically fall in the range of 3–5 seconds. It would be highly advantageous to produce EDLC capacitors having lower time constants.

Figure 1:
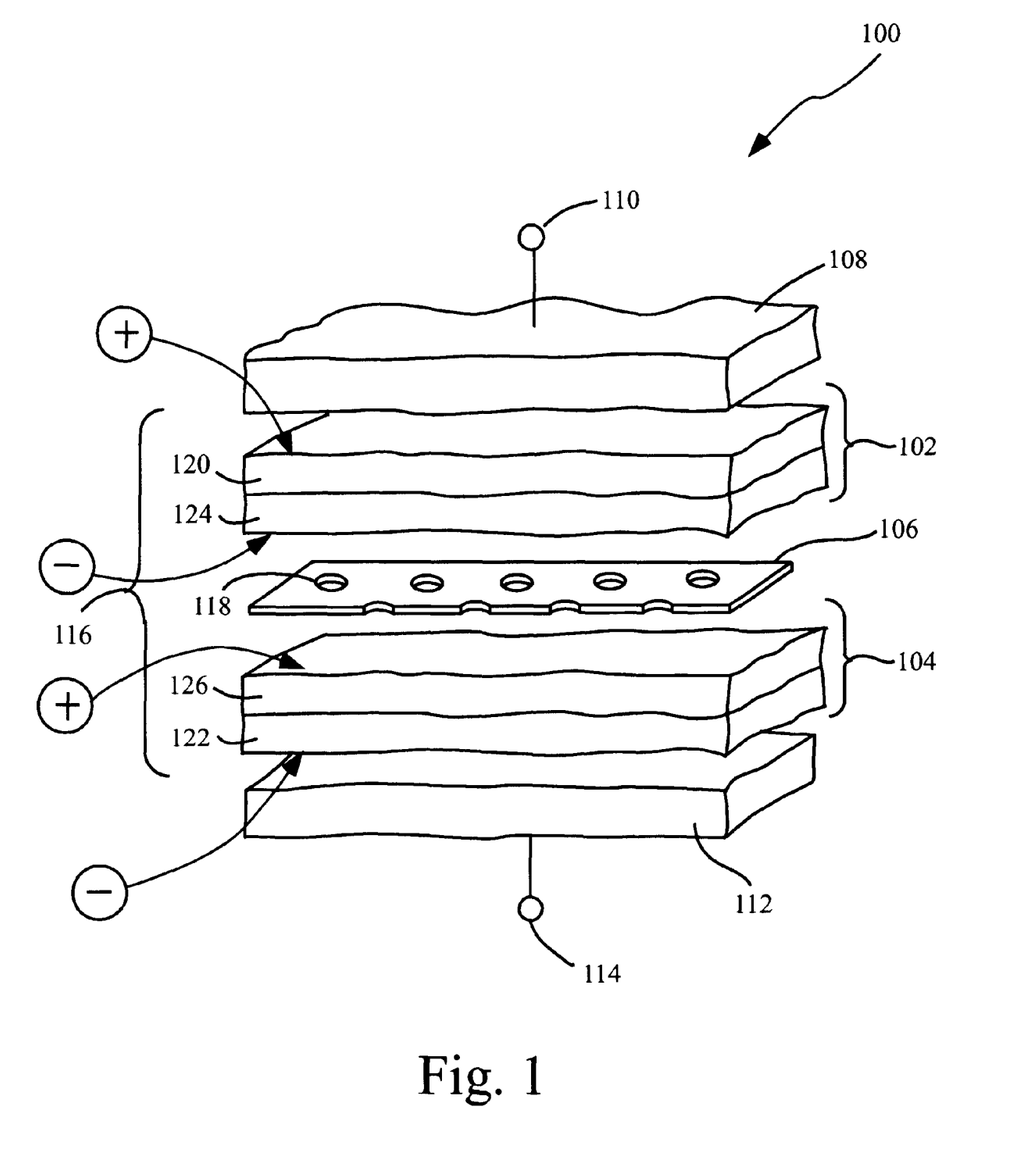
FIG. 1 is a schematic diagram illustrating a double layer capacitor made in accordance with the present invention.

Referring to FIG. 1, there is illustrated a schematic representation of a two-electrode single cell double layer capacitor 100 made in accordance with the present invention. The capacitor 100 has a very low internal resistance and is capable of yielding a high operating voltage. Furthermore, the capacitor 100 is capable of achieving an RC time constant of 0.5 seconds.

The capacitor 100 includes two spaced apart carbon powder electrodes 102, 104 electrically separated by a porous separator 106. One purpose of the electronic separator 106 is to assure that the opposing electrodes 102, 104 are never in contact with one another. Contact between electrodes results in a short circuit and rapid depletion of the charges stored in the electrodes.

The first electrode 102 is in contact with a current collector plate 108, which plate 108 is in turn connected to a first electrical terminal 110 of the capacitor 100. Similarly, the second electrode 104 is in contact with another current collector plate 112, which plate 112 is connected to a second electrical terminal 114 of the capacitor 100. The current collector plates 108, 112 preferably comprise aluminum foil or the like. The region between the electrodes 102, 104, as well as all of the available spaces and voids within the electrodes 102, 104, are filled with a highly conductive, preferably non-aqueous electrolytic solution 116.

The electrodes 102, 104, as explained in more detail below, are preferably formed by applying two different types of carbon powder slurries to the current collector plates 108, 112 in two separate coatings. Specifically, the first electrode 102 includes a primary (or primer) coating 120 that is in contact with the current collector plate 108. Similarly, the second electrode 104 includes a primary (or primer) coating 122 that is in contact with the current collector plate 112. The primary coatings 120, 122 preferably comprise a carbon powder film that contains highly conducting carbon powder in large proportion and a polymer binder. The proportion of highly conducting carbon included in the primary coatings 120, 122 preferably falls in the range of 25%–95%. The primary coatings 120, 122 preferably do not contain activated carbon.

The first electrode 102 also includes a secondary coating 124, and similarly, the second electrode 104 includes a secondary coating 126. The secondary coatings 124, 126 are both in contact with the separator 106. The secondary coatings 124, 126 are applied on top of the primary coatings 120, 122, respectively, and are preferably applied with slurry of activated carbon, conducting carbon and a polymer binder. The illustrated components are compressed against each other with a constant modest pressure, with the porous separator 106 preventing an electrical short between the electrodes 102, 104.

The electrodes 102, 104, with their primary coatings 120, 122 and secondary coatings 124, 126, have a lower resistance than electrodes made with a single coat of activated carbon, conducting carbon, and a polymer binder as described above.

The ions of the electrolytic solution 116 are free to pass through pores or holes 118 of the separator 106; yet the separator 106 prevents the electrode 102 from physically contacting, and hence electrically shorting with, the electrode 104. A preferred separator 106, for example, is polypropylene. Polypropylene includes rectangular-shaped pore openings having dimensions on the order of 0.04 by 0.12 $\mu$m. Another suitable separator material is polyethylene. Polyethylene generally has pore sizes on the order of 0.1 $\mu$m diameter or less.

In operation, when an electrical potential is applied across the terminals 110, 114, and hence across the series-connected electrodes 102, 104, a polarized liquid layer forms at each electrode immersed in the electrolyte 116. It is these polarized liquid layers which store electrostatic energy and function as the double layer capacitor—i.e., that function as two capacitors in series.

More specifically, as conceptually depicted by the "+" and "−" symbols (representing the electrical charge at the electrode-electrolyte interface of each electrode that is immersed in the electrolyte 116), when a voltage is applied across the electrodes, e.g., when electrode 102 is charged positive relative to electrode 104, a double layer is formed (symbolically depicted by the two "+/−" layers) by the polarization of the electrolyte ions due to charge separation under the applied electric field and also due to the dipole orientation and alignment of electrolyte molecules over the entire surface of the electrodes. This polarization stores energy in the capacitor according to the following relationships:

$$C = k_e A/d \qquad (1)$$

and $$E = CV^2/2 \qquad (2)$$

where C is the capacitance, $k_e$ is the effective dielectric constant of the double layer, d is the separation distance between the layers, A is the surface area of the electrodes that is immersed in the electrolytic solution, V is the voltage applied across the electrodes, and E is the energy stored in the capacitor.

In a double layer capacitor, the separation distance d is so small that it is measured in angstroms, while the surface area A, i.e., the surface area "A" per gram of electrode material, may be very large. Hence, as can be seen from Eq. (1), when d is very small, and A is very large, the capacitance will be very large.

The surface area "A" in the capacitor 100 is large because of the make-up of the electrodes 102, 104. Specifically, each of the electrodes 102, 104 comprises activated carbon powders in the secondary coatings 124, 126, respectively. Activated carbon is a highly porous form of carbon. The activated carbon powders do not have a smooth surface, but are pitted with numerous holes and pores. The holes and pores of the activated carbon powders have a typical size of about 10–100 Å (Angstroms). The powders are immersed in the electrolytic solution 116. Each hole and pore significantly increases the surface area of the powder that is exposed to the electrolytic solution 116. The result is a three-dimensional electrode structure which allows the electrolyte to penetrate into the holes and contact all, or most all, of the surface area of the carbon powders, thereby dramatically increasing the surface area "A" of the electrode over which the double layer of charged molecules is formed.

Achieving a high capacitance, however, is only part of the invention. The capacitor 100 is also capable of storing and discharging energy in a relatively quick time period. In general, the charge/discharge time of a capacitor is governed by the internal resistance of the capacitor. The lower the internal resistance, the shorter the charge/discharge time.

The internal resistance of the basic double layer capacitor 100 is made up of several components. Specifically, the internal resistance components include a contact resistance $R_C$, an electrode resistance $R_{EL}$, an electrolytic solution resistance $R_{ES}$, and a separator resistance $R_{SEP}$. The contact resistance $R_C$ represents all of the resistance in the current path between the capacitor terminal 110 up to the electrode 102, or all of the resistance in the current path between the capacitor terminal 114 and the electrode 104. The electrode resistance $R_{EL}$ represents the resistance within the electrode 102 (or within the electrode 104). The electrolytic solution resistance $R_{ES}$ exits relative to the electrolytic solution 116, and the separator resistance $R_{SEP}$ exists relative to the porous separator 106.

Any energy stored within the capacitor 100 enters or exits the capacitor by way of an electrical current that flows through $R_C$, $R_{EL}$, $R_{ES}$, and $R_{SEP}$. Thus it is seen that in order for practical charge/discharge times to be achieved, the values of $R_C$, $R_{EL}$, $R_{ES}$, and $R_{SEP}$, which in combination with the capacitance C define the time constant $\tau_C$ of the capacitor 100, are preferably kept as low as possible.

The resistance of the separator $R_{SEP}$ is a function of the porosity and thickness of the separator 106. A preferred separator material is polypropylene having a thickness of about 0.001 inches (0.025 mm). An alternative separator material is polyethylene, also having a thickness of about 0.001 inches (0.025 mm). Polypropylene inherently has larger pores than does polyethylene due the manner in which polypropylene is constructed. Polypropylene typically exhibits a porosity of 25–40%; whereas polyethylene exhibits a porosity of 40–60%. Hence, polyethylene inherently demonstrates a lower separator resistance than does polypropylene simply because it has a higher porosity, i.e, there are more pores or openings through which the electrolyte ions may flow, even though the holes are, on average, smaller. In addition, a paper separator may also be used.

The resistance $R_{ES}$ relative to the electrolytic solution 116 is determined by the conductivity of the particular electrolytic solution that is used. In selecting the type of electrolytic solution to use, several tradeoffs are considered. Aqueous electrolytic solutions generally have a higher conductivity than do non-aqueous solutions (e.g., by a factor of 10). However, aqueous solutions limit the working voltage of the capacitor cell to around 0.5 to 1.0 volt. Because the energy stored in the cell is a function of the square of the voltage, high energy applications are probably better served using a non-aqueous electrolyte, which permit cell voltages on the order of 2.0 to 3.0 volts. One preferred electrolyte 116 for use with the double layer capacitor 100 described herein is made from a mixture of acetonitrile ($CH_3CN$) and a suitable salt, which mixture exhibits a conductivity on the order of 60 $ohm^{-1}$ $cm^{-1}$. By way of example, one suitable salt is tetra ethylammonium tetra fluoriborate ($Et_4NBF_4$). It is to be emphasized, however, that the invention herein described contemplates the use of alternate electrolytic solutions, particularly non-aqueous (or organic) electrolytic solutions, other than the solution made from acetonitrile described above. By way of example, possible solvents include propylene carbonate (PC), ethylmethyl carbonate (EMC), ethylene carbonate (EC), dimethyl carbonate (DMC), and their mixtures.

The contact resistance $R_C$ in combination with the electrode resistance $R_{EL}$ represent a significant portion of the total internal resistance of the capacitor 100. A high electrode resistance has heretofore been a major stumbling block in the development of commercially viable, high energy density, double layer capacitors. A key feature of the present invention is to provide a double layer capacitor having a very low electrode resistance in combination with a high energy density. A result of the present invention is that $R_C + R_{EL}$ are reduced to a value that is small in comparison to $R_{SEP} + R_{ES}$.

The unique structure of the electrodes 102, 104 described herein contributes to the electrode resistance $R_{EL}$ being very small. Specifically, the large proportion of highly conducting carbon powder and the lack of activated carbon in the primary coatings 120, 122 significantly reduces the total electrode resistance $R_{EL}$. This is because the interface resistance between the primary coating 120 (or 122) and the collector plate 108 (or 112) is extremely low due to the highly conducting carbon powder. Furthermore, the interface resistance between the primary coating 120 (or 122) and the secondary coating 124 (or 126) is also extremely low due to carbon/carbon interface. Because of the intimate mixing of the primary coating 120 (or 122) and the secondary coating 124 (or 126), the interface area of the primary coating and the secondary coating is higher. This increased interface area establishes a greater number of conducting paths for the activated carbon than would otherwise be possible without the primary coatings 120, 122. This increased number of conducting paths decreases the resistance.

An important aspect of the present invention, as will become more apparent from the description that follows, is the use of multiple carbon powder electrodes connected in parallel within a capacitor package that requires only a single electrolyte seal. One example configuration for parallel connected multiple carbon powder electrodes is a "flat stack" of electrodes. It should be well understood, however, that there are many other configurations for parallel connected multiple carbon powder electrodes that may be used in accordance with the present invention. Because only one electrolyte seal is required, it is appropriate to refer to such capacitor as a "single cell" capacitor since it is the electrolyte seal which normally defines what comprises a cell. Such a single cell, multi-electrode double layer capacitor configuration is a preferred way of practicing the invention at the present time. It is to be emphasized, however, that the invention is not intended to be limited to such mode or embodiment. Rather, it is contemplated that the invention extend to all double layer capacitors that use low-resistance carbon powder electrodes in accordance with the present invention, regardless of the specific electrode configuration that may eventually be used to make the capacitor, and regardless of the specific high conductivity electrolytic solution that is employed. Such electrode configurations may include, e.g., multiple electrodes connected in parallel in a single cell (as is described more fully herein); a pair of electrodes arranged in a spiral pattern in a single cell; electrodes connected in series in stacked cells; or other electrode configurations.

Figure 2:
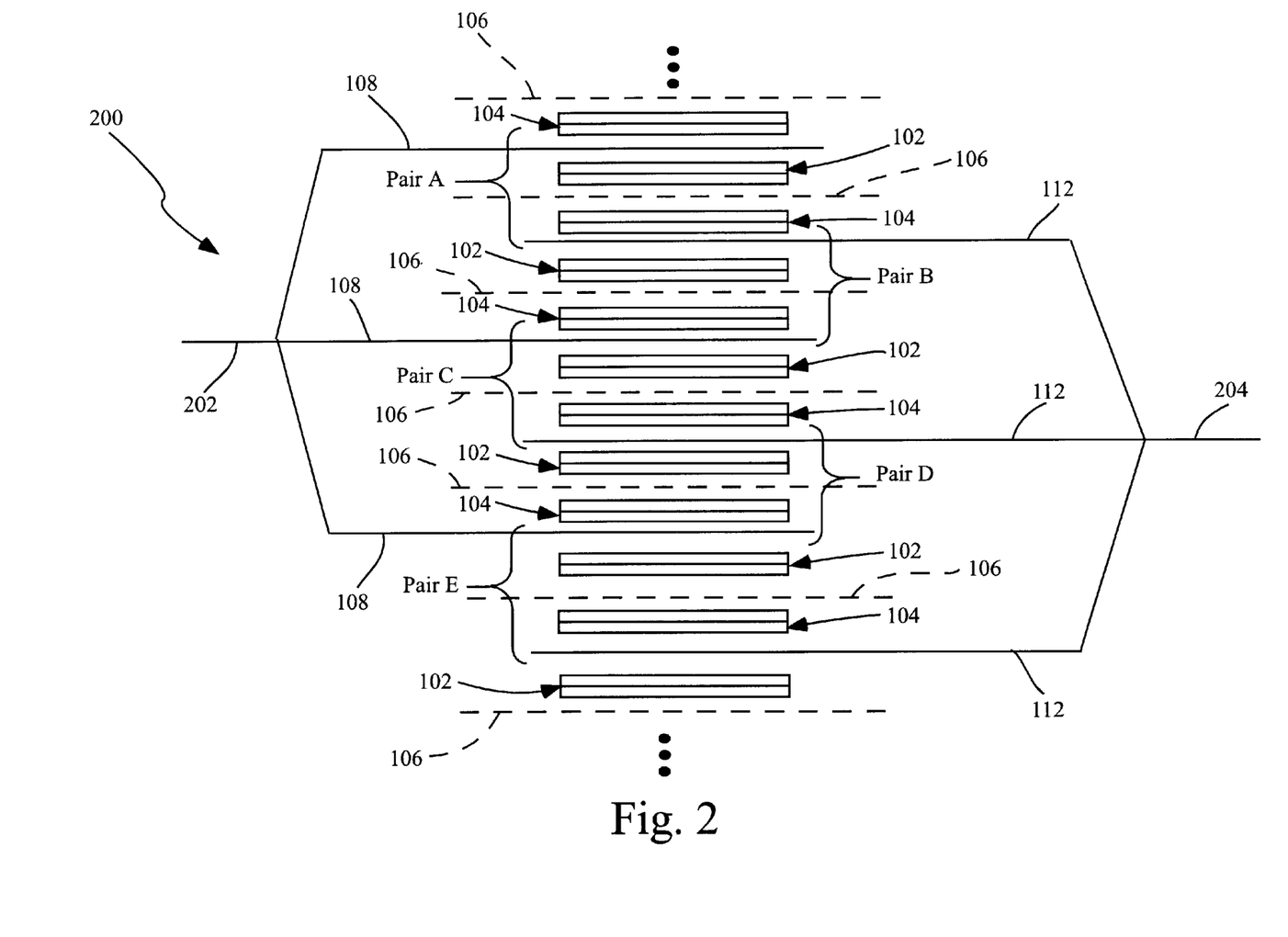
FIG. 2 is a schematic diagram illustrating a multi-electrode double layer capacitor made in accordance with the present invention.

Referring to FIG. 2, there is illustrated a schematic representation of a multiple-electrode single cell double layer capacitor 200 made in accordance with the present invention. The capacitor 200 comprises a structure of the components from several of the two-electrode double layer capacitors 100 described above. The current collector plates 108 are connected in parallel to a first electrical terminal 202 of the capacitor 200, and the current collector plates 112 are connected in parallel to a second electrical terminal 204 of the capacitor 200. The electrodes associated with the first terminal 202 comprise a first set of electrodes, and the electrodes associated with the second terminal 204 comprise a second set of electrodes. The individual electrodes of the first set are interleaved with the individual electrodes of the second set. The porous separators 106 prevent electrical shorting between the interleaved individual electrodes. As mentioned above, the current collector plates 108, 112 preferably comprise aluminum foil or the like. The electrodes 102, 104 comprise the two-coating (or two-layer) carbon powder electrodes described above.

The first and second sets of electrodes in the capacitor 200 may comprise many different physical configurations. For example, in one configuration the capacitor 200 may comprise a stacked structure. In this stacked configuration the electrodes associated with the first terminal 202 may comprise a first flat stack of electrodes and the electrodes associated with the second terminal 204 may comprise a second flat stack of electrodes. It should be well understood, however, that there are many other physical configurations for the first and second sets of electrodes in the capacitor 200 that may be used in accordance with the present invention.

In the figure, a plurality of series connected capacitor electrode pairs A, B, C, D and E are identified within the electrode structure which forms the capacitor 200. Fewer or more of the electrode pairs may be included. Each electrode pair includes a pair of carbon powder electrodes 102, 104 which are preferably fabricated as described herein. Pair A includes electrodes 102 and 104 facing one another with the ionically conductive separator 106 disposed between them. Similarly, pairs B, C, D and E each include electrodes 102 and 104 facing one another with ionically conductive separators 106 disposed between them.

The internal non-porous current collector plates 108, 112 are placed between each electrode pair in the illustrated manner. Each of the current collector plates 108, 112 has two adjoining polarized electrodes on each side thereof. It will be appreciated that the illustrated components are compressed against each other with a constant modest pressure, with the porous separators 106 preventing an electrical short between the electrodes 102, 104. A sufficient amount of a highly conductive, preferably non-aqueous electrolytic solution is introduced into the cell such that the electrolyte saturates all of the electrodes 102, 104 and separators 106 within each pair.

During operation, if in electrode pair A the upper electrode 102 is a negative electrode, the lower electrode 104 of pair A becomes oppositely charged, i.e., becomes a positive electrode. The same charge of electrode 104 of pair A carries over to the upper electrode 102 of pair B, i.e., electrode 102 of pair B becomes positively charged relative to electrode 102 of pair A. This causes the lower electrode 104 of pair B to become oppositely charged, i.e., negatively charged relative to electrode 102 of pair B. The electrodes of pairs C, D, E become charged in a similar manner.

Figure 3:
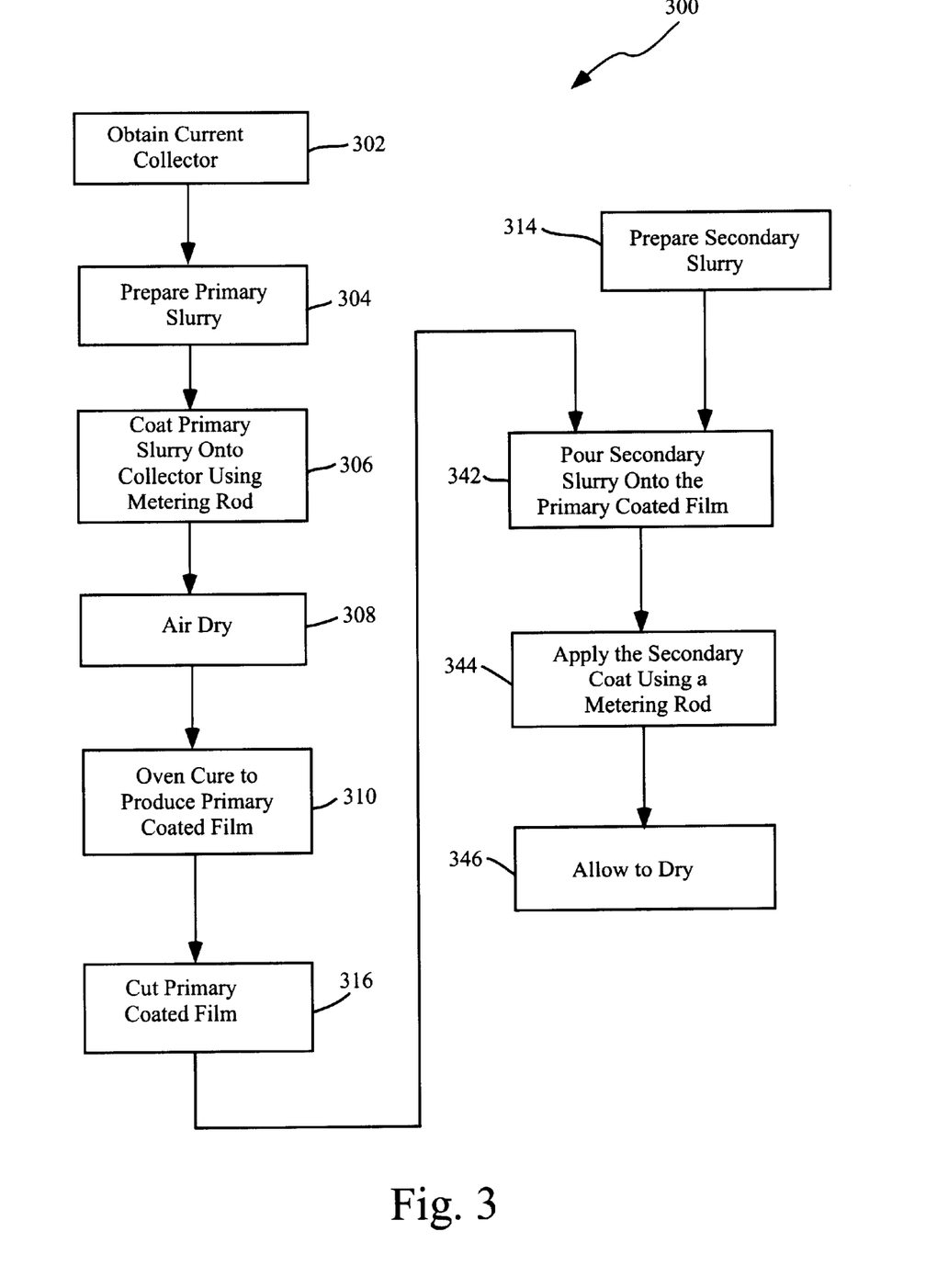
FIG. 3 is a flowchart illustrating an exemplary process in accordance with the present invention for making the carbon powder electrodes shown in FIGS. 1 and 2.

As mentioned above, the electrodes 102, 104 are preferably formed by applying two different types of carbon powder slurries to the current collector plates 108, 112 in two separate coatings. Alternatively, the electrodes 102, 104 may be formed by forming two different carbon powder laminated films to the current collector plates 108, 112 instead of using slurries. With respect to the carbon powder slurry technique, FIG. 3 illustrates an exemplary process 300 in accordance with the present invention that may be used for making the carbon powder electrodes of the capacitor 100 and/or 200.

Figure 4:
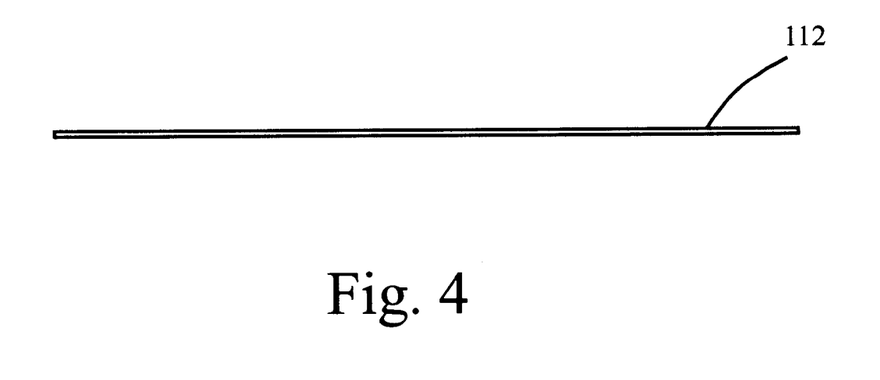
FIG. 4 is a side view illustrating one of the current collector plates shown in FIG. 1.

The exemplary process 300 begins in step 302 by obtaining a current collector plate, such as the current collector plate 112 shown in FIG. 4. The current collector plate 112 (and 108) preferably comprises aluminum foil. Other suitable materials for use as the current collector plates include copper, nickel, stainless steel foils, and any conducting current collectors.

The current collector plate 112 is first coated with the primary coating 122. The primary coating 122 comprises a carbon film containing highly conducting carbon powder in large proportion (e.g., 25%–95%) and a polymer binder. The primary coat 122 preferably does not contain activated carbon.

The primary coating 122 is preferably applied to the current collector plate 112 in the form of a slurry. The slurry used to form the primary coating 122 is prepared in step 304. By way of example, the slurry may comprise a slurry supplied by Acheson Colloids Company, Inc. of Port Huron, Mich. Alternatively, the slurry used to form the primary coating 122 may be made from conducting carbon powders like acetylene black and/or graphite. For example, one exemplary slurry for the primary coating 122 can be made by mixing commercially available graphite and the binder polyvinyldiflouride (PVDF) in acetone. PVDF can be obtained from Elf Atochem Co. of France, as "Kynar", catalog no. PVDF 2801-00. By way of example, the commercially available graphite may be obtained from Timcal America of Westlake, Ohio, but it should be understood that any other type of graphite may be substituted. Preferably, the amount of conducting carbon powders used in the slurry falls in the range of 25 w % to 95 w % ("w %" meaning percent by weight), with the remainder of the slurry consisting of the PVDF in acetone. Ideally, the composition of graphite can be between 50 w % and 95 w %.

Figure 5:
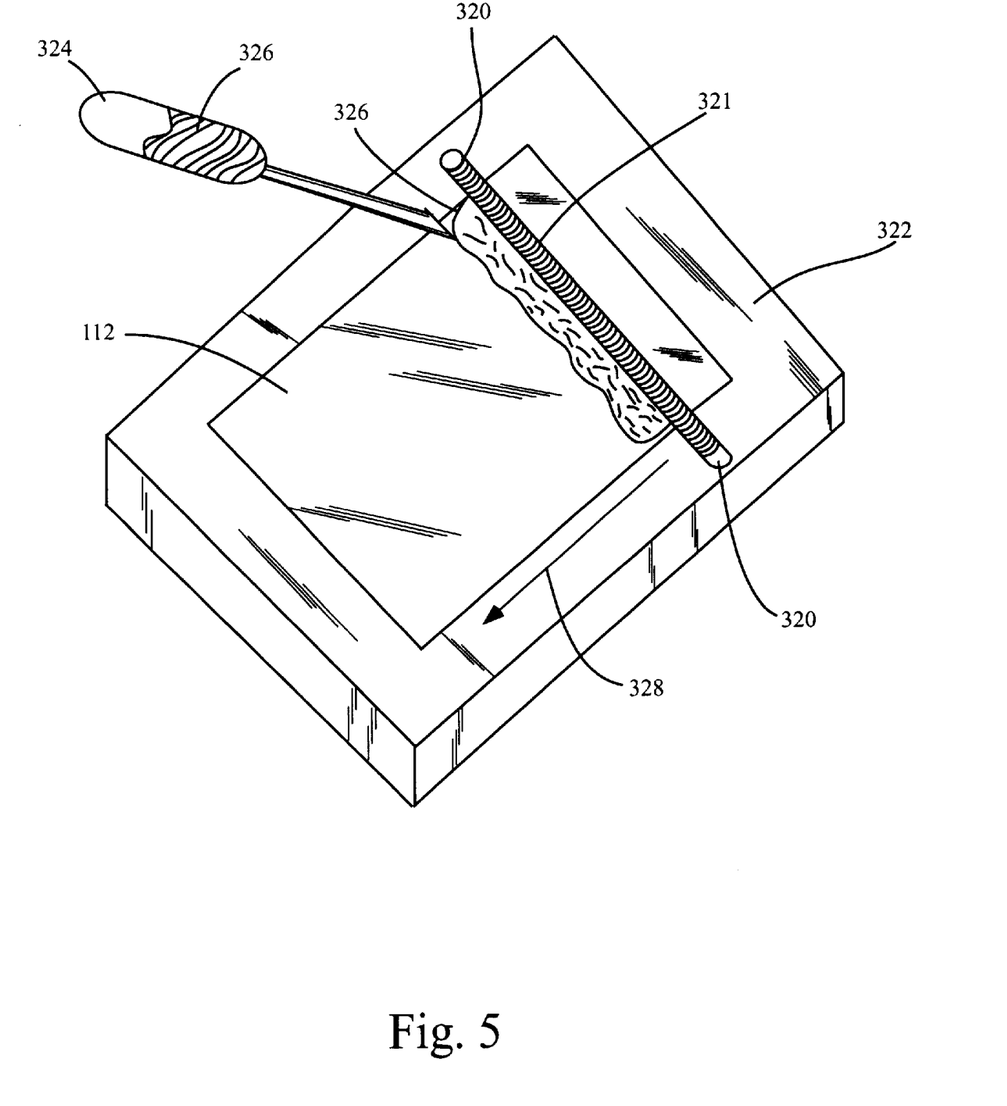
FIG. 5 is an isometric view illustrating a process of coating the current collector plate shown in FIG. 4.

After the slurry used to form the primary coating 122 is prepared, it is then coated onto the current collector 112 in step 306. Referring to FIG. 5, the slurry is preferably coated onto the aluminum foil current collector 112 with a metering rod 320 to give a wet coating of 125 um. Specifically, the aluminum foil current collector 112 is placed on a granite block 322 that has a smooth surface. The metering rod 320 (such as is available from Diversified Enterprises of Claremont, N.H.) includes coils 321. A pipet 324 is used to apply the primary carbon slurry 326 onto the surface of the aluminum foil 112 in front of the metering rod 320. The metering rod 320 is then dragged down the length of the aluminum foil 112 in the direction of arrow 328. The metering rod 320 is kept flush with the aluminum foil 112 while it is being dragged. The carbon slurry will be left in the wake of the metering rod 320 at a thickness dependent on the coil 321 separation distance on the metering rod 320. While use of the metering rod 320 is effective for coating the primary carbon slurry 326 onto the aluminum foil current collector 112, it should be understood that other methods of coating may be used.

Figure 6:
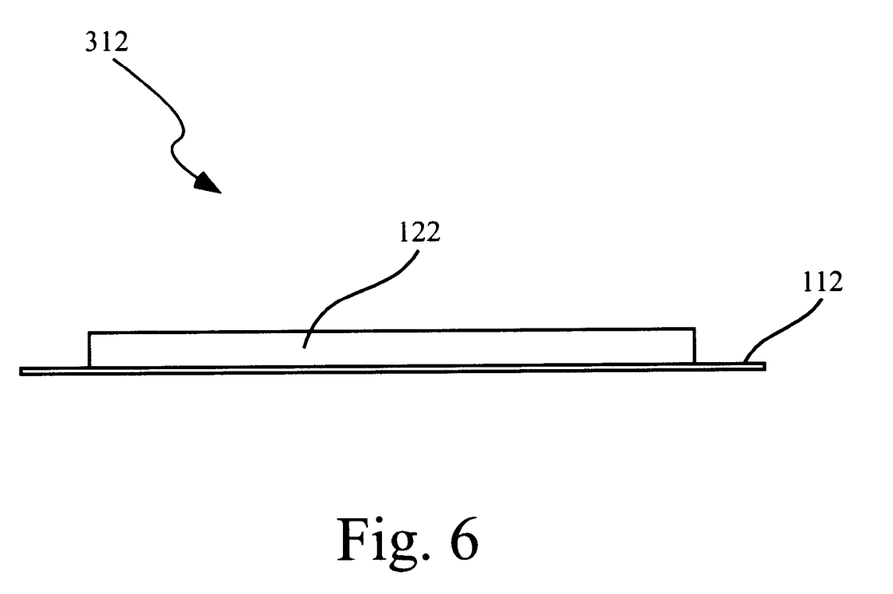
FIG. 6 is a side view illustrating the coated current collector plate resulting from the process shown in FIG. 5.

In step 308 the coating is air dried for one-half hour, and in step 310 the coating is cured at 80° C. for one hour in an oven. The thickness of the resulting primary coating 122 is about 4 to 6 $\mu$m. The resulting primary coated film 312 (i.e., current collector 112 with primary coating 122 thereon) is illustrated in FIG. 6.

The secondary coating 126 is applied on top of the primary coating 122. The secondary coating 126 preferably comprises activated carbon, conducting carbon and a polymer binder. Like the primary coating 122, the secondary coating 126 is also preferably applied in the form of a slurry. The amount of the activated carbon powder in this slurry preferably falls in the range of 50 to 98 percent-by-weight.

The slurry of activated carbon, conducting carbon and a polymer binder used to form the secondary coating 126 is prepared in step 314. The slurry preferably includes the following ingredients: a solvent, a binder, and activated carbon powders. By way of example, the amount of solvent may be 80.6 w %, the amount of binder may be 1.63%, and the amount of activated carbon powder may be 17.77%. Exemplary solvents are either water or acetone. Exemplary binders are PVDF, methyl cellulose and EPDM (Ethylene Propylene Diene Monomer). Activated carbon powders may be obtained from Westvaco High Power of Virginia, or from Spectracorp, catalog no. BP-25.

An exemplary process for the preparation of the slurry used to form the secondary coating 126 is as follows. First, the binder is weighed into a 100 mL glass jar to which a magnetic stirbar has been added. The solvent, which has been weighed out in a separate bottle, is added to the jar of the binder. The jar is sealed and set on a stirplate for an hour, with intermittent shaking by hand. During this time, the activated carbon powders and the conductive carbon powders are weighed out in a 100 mL beaker and set aside. After the hour, the jar of binder solution is taken off the stirplate, the stirbar is removed, and the weighed carbon powders are carefully added with a small scoop. The jar is placed under an ordinary kitchen mixer and the mixer is turned on to the lowest speed to allow the carbon powders to get wet. Once the powders are wet, the speed is increased and the jar moved up and down to provide sufficient mixing of the slurry. The jar is then set below the mixer and allowed to mix for 10 minutes. After completion of mixing, the lid is placed on the jar and the slurry is shaken vigorously by hand for approximately 30 seconds. The jar is placed on a jar roller apparatus until it is used.

Figure 7:
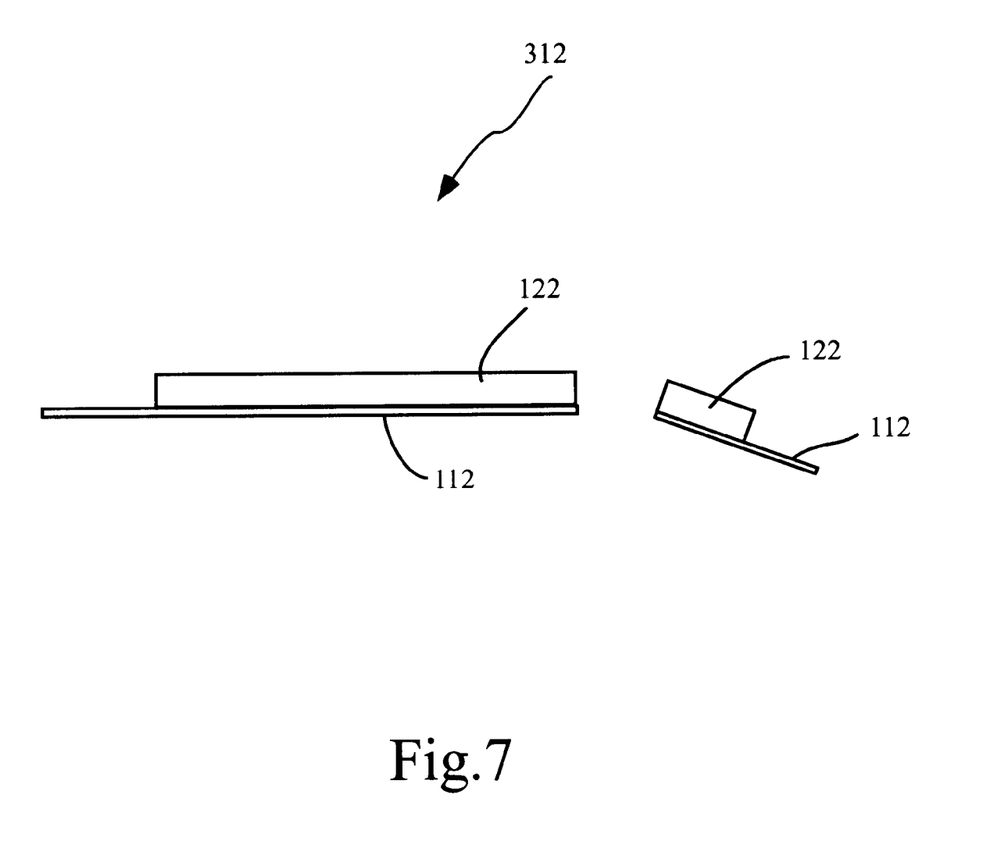
FIG. 7 is a side view illustrating a process of cutting the coated current collector plate shown in FIG. 6.

Once the slurry that will be used to form the secondary coating 126 has been prepared, a desired length of the primary coated film 312 (i.e., collector 112 with primary coating 122 thereon) is cut in step 316. This cutting step is illustrated in FIG. 7. In step 342 the secondary slurry that was prepared in step 314 is poured onto the desired length of the primary coated film 312. In step 344 the secondary slurry is applied to the desired length of the primary coated film 312.

Step 344 may be performed using the metering rod 320 and the granite block 322 shown in FIG. 5. Specifically, the desired length of the primary coated film 312 is placed on the surface of the granite block 322. The pipet 324 is used to apply the secondary slurry onto the surface of the desired length of the primary coated film 312 in front of the metering rod 320. The metering rod 320 is then dragged as described above. It should be understood, however, that use of the metering rod 320 to apply the secondary slurry is not a requirement of the present invention and that other methods may be used.

Figure 8:
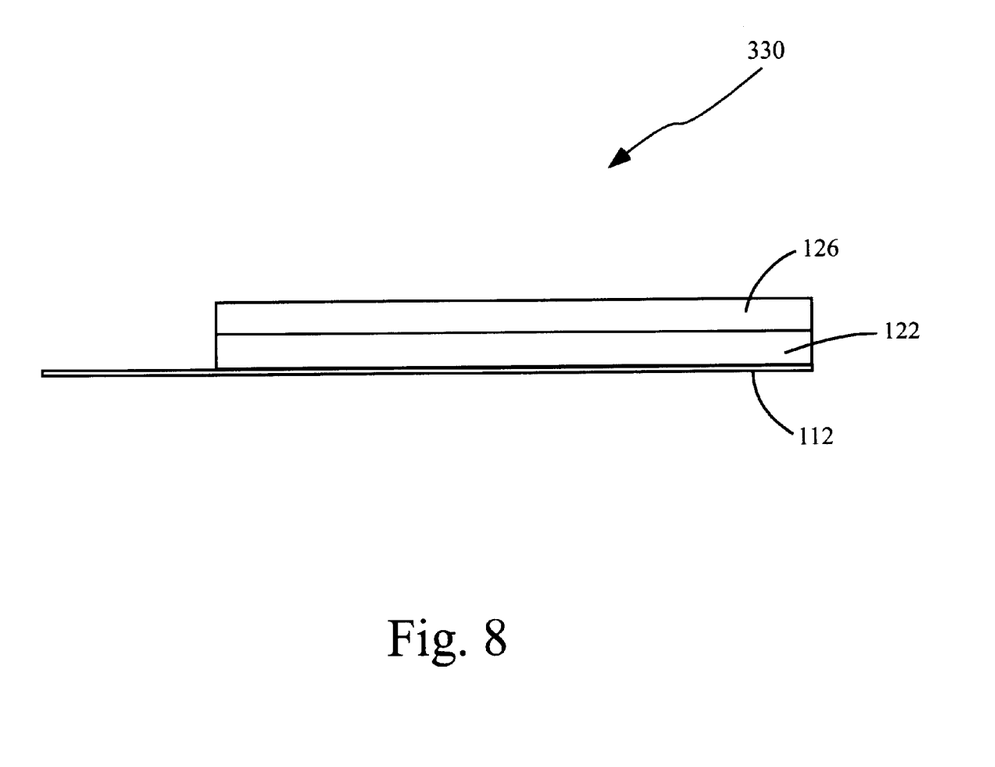
FIG. 8 is a side view illustrating a secondary coating applied to the coated current collector plate shown in FIG. 7.

The resulting primary and secondary coated carbon film 330, which is illustrated in FIG. 8, is then allowed to dry for approximately 10 minutes in step 346. When it is dry, the carbon film 330 is ready to be made into electrodes.

It should be understood that the above described process 300 may be used to form the electrodes 102, 104 in the capacitors 100 and 200. In order to form the primary and secondary coatings on the reverse side of the current collector 112 (and 108) that are illustrated in FIG. 2, the carbon film 330 is simply turned over and the appropriate steps in the process 300 are repeated on the second surface.

The above-described method of making carbon powder electrodes makes possible EDLC capacitors having time constants $\tau_C$ on the order of 0.5 seconds. Furthermore, the method results in carbon powder electrodes with a lower resistance than electrodes having only a single coat of activated carbon, conducting carbon, and a binder, i.e., electrodes with no primary (or primer) coating as described above.

In order to illustrate this later point, Tables 1 and 2 below show the difference in performance between carbon powder electrodes without and with a primary (or primer) coat. Specifically, several EDLC capacitor cells were made. The capacitor cells were tested using an impedance analyzer and in some cases by constant current. The electrodes in all of the capacitor cells identified in both Tables 1 and 2 include one coating that consists primarily of activated carbon powder. The specific composition of the slurry used to make the primarily activated carbon powder coating for each cell is shown in the tables. The difference between Tables 1 and 2 is that the electrodes in the capacitor cells identified in Table 1 do not include a primer coating, whereas the electrodes in the capacitor cells identified in Table 2 do include a primer coating.

TABLE 1

Without Primer Coating

| Cell ID | Slurry Composition used for the Primarily Activated Carbon Powder Layer | Resistance Ohm.cm$^2$ | Capacitance F/cm$^2$ | RC |
|---|---|---|---|---|
| RC0604 | BP-25 (90 w %), SFG-44 (1.5 w %), Kynar (8.5 w %) | 1402 | 0.011 | 15.4 |
| RC0605 | Same as above | 627 | 0.012 | 7.2 |
| RC0608 | BP-25 (90 w %), SFG-44 (8 w %), Kynar (2 w %) | 964 | 0.007 | 7.0 |
| 9829-01-01 | Westvaco-CHR-98-55 (90 w %), Black Pearl (1.5 w %), Kynar (8.5 w %) | 10.3 | 0.16 | 1.7 |

TABLE 2

With Primer Coating

| Cell ID | Slurry Composition used for the Primarily Activated Carbon Powder Layer | Resistance Ohm.cm$^2$ | Capacitance F/cm$^2$ | RC |
|---|---|---|---|---|
| 51291-1 | BP-25 (91.4 w %), Kynar (8.6 w %) | 4.62 | 0.09 | 0.42 |
| 51291-2 | Same as above | 4.08 | 0.10 | 0.39 |
| 51291-3 | Same as above | 7.48 | 0.09 | 0.65 |
| 51291-4 | Same as above | 4.39 | 0.09 | 0.39 |

As can be seen from the tables, capacitor cell resistance and time constants are significantly lower for the capacitor cells identified in Table 2, which are the cells that have a primer coating on the electrodes.

In the tables, BP-25 is an exemplary type of activated carbon powder that is available from Spectracorp, SFG-44 is an exemplary type of graphite that is available from Timcal America, Kynar 2801-00 is an exemplary type of binder that is available from Elf Atochem Co., CHR-98-55 is an exemplary type of activated carbon powder that is available from Westvaco High Power, and Black Pearl is an exemplary type of carbon that is available from Cabot.

In a preferred embodiment of the present invention, the binder content in the slurry used to form the coating that is primarily activated carbon powder is lower than is illustrated in Table 2. A preferred value for the binder content is shown in Table 3, which illustrates the measured performance for capacitor cells having carbon powder electrodes that include a primer coating in accordance with the present invention.

TABLE 3

With Primer Coating

| Cell ID | Slurry Composition used for the Primarily Activated Carbon Powder Layer | Area Resistance Ohm.cm$^2$ | Capacitance F/cm$^2$ | RC |
|---|---|---|---|---|
| 51291-1 | BP-25 (97 w %), Kynar (3 w %) | 4.95 | 0.12 | 0.59 |
| 51291-2 | Same as above | 4.30 | 0.14 | 0.58 |
| 51291-3 | Same as above | 5.07 | 0.12 | 0.62 |
| 51291-4 | Same as above | 3.94 | 0.12 | 0.46 |

Additional packaging and manufacturing techniques that may be used with the present invention are disclosed in U.S. Provisional Patent Application No. 60/188,331, entitled "HIGH SPEED MANUFACTURING OF ULTRACAPACITORS", filed Mar. 9, 2000, by inventors C. Farahmandi, Edward Blank, Chenniah Nanjundiah and Brad Emberger, as attorney docket no. 66238, the full disclosure of which is hereby fully incorporated into the present application by reference. Furthermore, the full disclosure of U.S. Pat. No. 5,907,472 is hereby fully incorporated into the present application by reference.

While the invention herein disclosed has been described by the specific embodiments and applications thereof, numerous modifications and variations could be made thereto by those skilled in the art without departing from the scope of the invention set forth in the claims.

What is claimed is:

1. A method of making an electrode structure for use in a double layer capacitor, comprising the steps of:

preparing a first slurry that includes conducting carbon powder and a binder;

applying the first slurry to a current collector plate;

drying the applied first slurry to form a primary coating;

preparing a second slurry that includes activated carbon powder, a solvent and a binder; and applying the second slurry to the primary coating.

2. A method in accordance with claim 1, wherein an amount of the conducting carbon powder in the first slurry falls in the range of 25 to 95 percent-by-weight.

3. A method in accordance with claim 1, wherein the first slurry is free of activated carbon.

4. A method in accordance with claim 1, wherein an amount of the activated carbon powder in the second slurry falls in the range of 50 to 98 percent-by-weight.

5. A method in accordance with claim 1, wherein the second slurry further comprises conducting carbon powder.

6. A method in accordance with claim 1, wherein the step of preparing the second slurry comprises the steps of:

mixing the binder and the solvent;

stirring the mixed binder and solvent;

adding the activated carbon powder to the mixed binder and solvent; and mixing the activated carbon powder into the mixed binder and solvent.

7. A method in accordance with claim 6, wherein the step of mixing the activated carbon powder into the mixed binder and solvent comprises the step of:

initially mixing slowly to allow the carbon powders to get wet;

mixing with an automatic mixer for approximately 10 minutes; and shaking vigorously for approximately 30 seconds.

8. A method in accordance with claim 1, wherein the step of applying the first slurry to a current collector plate comprises the step of:

applying the first slurry to the current collector plate with a metering rod.

9. A method in accordance with claim 1, wherein the step of drying the applied first slurry to form a primary coating comprises the step of:

curing the applied first slurry in an oven.

10. A method in accordance with claim 1, wherein an amount of the conducting carbon powder in the first slurry falls in the range of 50 to 95 percent-by-weight.

11. A method of making an electrode structure for use in a double layer capacitor, comprising the steps of:

preparing a first slurry that includes a liquid, conducting carbon powder and a polymeric binder;

coating the first slurry on to a surface of a current collector plate;

drying the applied first slurry to remove the liquid to form a primary coating layer:

preparing a second slurry that includes activated carbon powder, a binder of polymeric material and a solvent for the polymeric material;

coating the second slurry on to the primary coating layer; and removing the solvent to form a secondary coating layer to create an overall electrode structure containing a polymer and carbon.

* * * * *